(12) United States Patent
Bar-Or Tillinger et al.

(10) Patent No.: US 11,705,954 B2
(45) Date of Patent: Jul. 18, 2023

(54) TRANSMISSION CONFIGURATION INDICATOR STATE GROUP INDICATION

(71) Applicant: QUALCOMM Incorporated, San Diego, CA (US)

(72) Inventors: Amit Bar-Or Tillinger, Tel-Aviv (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/195,082

(22) Filed: Mar. 8, 2021

(65) Prior Publication Data

US 2022/0286188 A1 Sep. 8, 2022

(51) Int. Cl.
*H04B 7/06* (2006.01)
*H04W 72/044* (2023.01)
*H04W 72/21* (2023.01)
*H04W 72/53* (2023.01)

(52) U.S. Cl.
CPC ......... *H04B 7/0697* (2013.01); *H04B 7/0695* (2013.01); *H04W 72/046* (2013.01); *H04W 72/21* (2023.01); *H04W 72/53* (2023.01)

(58) Field of Classification Search
CPC .. H04B 7/0697; H04B 7/0695; H04B 7/0874; H04W 72/0413; H04W 72/046; H04W 72/0493; H04W 72/08; H04W 72/1289
See application file for complete search history.

(56) References Cited

U.S. PATENT DOCUMENTS

2022/0030620 A1* 1/2022 Cirik ................. H04W 16/28

FOREIGN PATENT DOCUMENTS

| WO | WO-2019138284 A1 * | 7/2019 | ........... H04B 7/0626 |
| WO | 2021009916 A1 | 1/2021 | |
| WO | WO-2021198933 A1 * | 10/2021 | |
| WO | WO-2021198991 A1 * | 10/2021 | |

OTHER PUBLICATIONS

International Search Report and Written Opinion—PCT/US2022/070635—ISA/EPO—dated May 27, 2022.
Moderator (Samsung): "Moderator Summary#2 for Multi-Beam Enhancement: Proposal Catogorization", 3GPP TSG RAN WG1 #102-e, R1-2007189, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 27, 2020, XP051922607, 27 Pages.

* cited by examiner

*Primary Examiner* — Thai Nguyen
(74) *Attorney, Agent, or Firm* — Harrity & Harrity LLP

(57) ABSTRACT

Various aspects of the present disclosure generally relate to wireless communication. In some aspects, a user equipment (UE) may receive an indication to apply, for one or more uplink communications of a spatial division multiplexing (SDM) configuration, a group indication associated with downlink beams. The UE may transmit the one or more uplink communications based at least in part on the group indication associated with the downlink beams. Numerous other aspects are described.

30 Claims, 8 Drawing Sheets

TRANSMISSION CONFIGURATION INDICATOR STATE GROUP INDICATION

FIELD OF THE DISCLOSURE

Aspects of the present disclosure generally relate to wireless communication and to techniques and apparatuses for applying a transmission configuration indicator state group indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
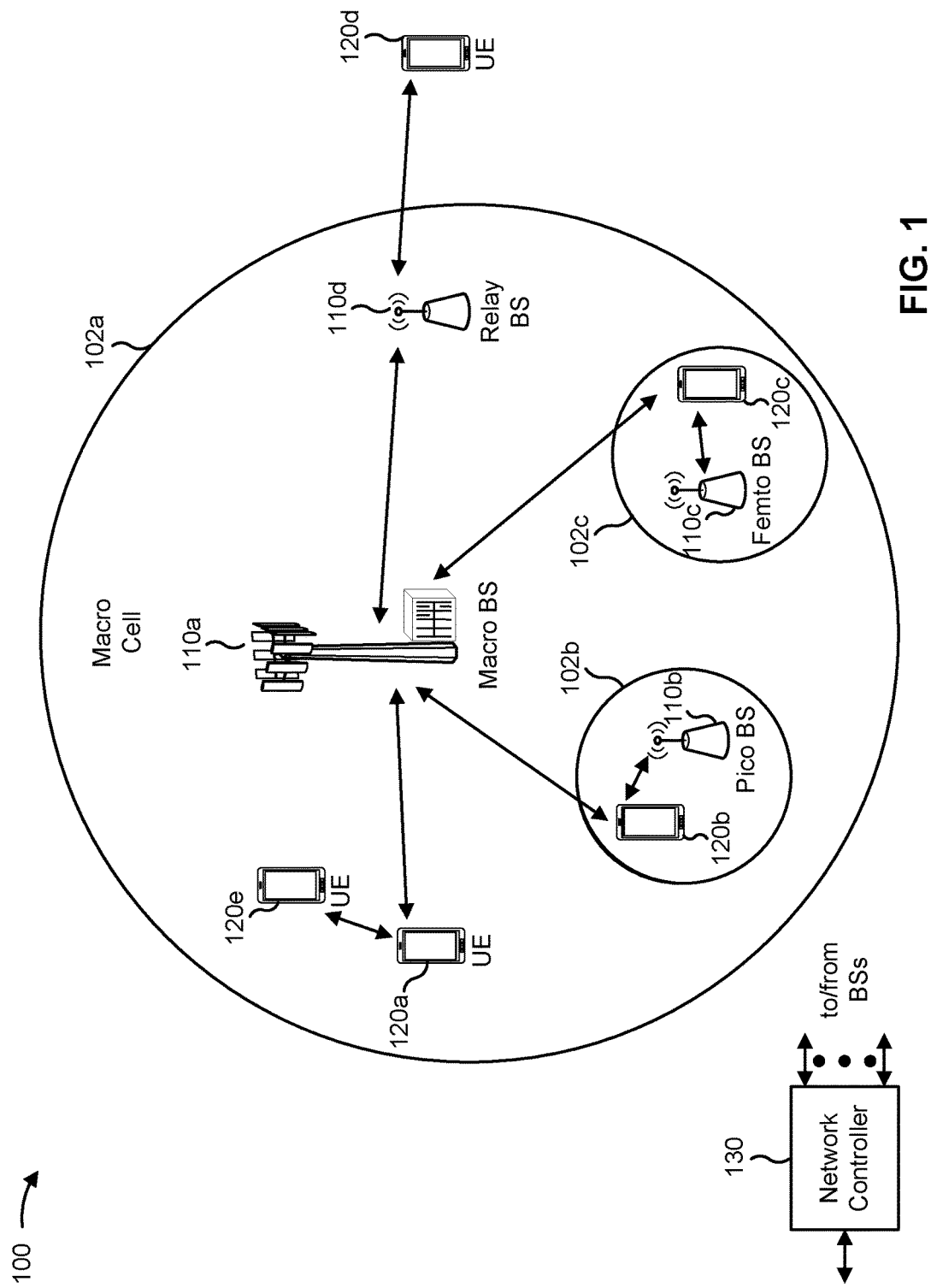
FIG. 1 is a diagram illustrating an example of a wireless network, in accordance with the present disclosure.

In some aspects, a method of wireless communication performed by a user equipment (UE) includes receiving an indication to apply, for one or more uplink communications of a spatial division multiplexing (SDM) configuration, a group indication associated with downlink beams; and transmitting the one or more uplink communications based at least in part on the group indication associated with the downlink beams.

In some aspects, a method of wireless communication performed by a base station includes transmitting an indication to apply, for one or more uplink communications of an SDM configuration, a group indication associated with downlink beams; and receiving the one or more uplink communications based at least in part on the group indication associated with the downlink beams.

In some aspects, a UE for wireless communication includes a memory and one or more processors, coupled to the memory, configured to: receive an indication to apply, for one or more uplink communications of an SDM configuration, a group indication associated with downlink beams; and transmit the one or more uplink communications based at least in part on the group indication associated with the downlink beams.

In some aspects, a base station for wireless communication includes a memory and one or more processors, coupled to the memory, configured to: transmit an indication to apply, for one or more uplink communications of an SDM configuration, a group indication associated with downlink beams; and receive the one or more uplink communications based at least in part on the group indication associated with the downlink beams.

In some aspects, a non-transitory computer-readable medium storing a set of instructions for wireless communication includes one or more instructions that, when executed by one or more processors of a UE, cause the UE to: receive an indication to apply, for one or more uplink communications of an SDM configuration, a group indication associated with downlink beams; and transmit the one or more uplink communications based at least in part on the group indication associated with the downlink beams.

In some aspects, a non-transitory computer-readable medium storing a set of instructions for wireless communication includes one or more instructions that, when executed by one or more processors of a base station, cause the base station to: transmit an indication to apply, for one or more uplink communications of an SDM configuration, a group indication associated with downlink beams; and receive the one or more uplink communications based at least in part on the group indication associated with the downlink beams.

In some aspects, an apparatus for wireless communication includes means for receiving an indication to apply, for one or more uplink communications of an SDM configuration, a group indication associated with downlink beams; and means for transmitting the one or more uplink communications based at least in part on the group indication associated with the downlink beams.

In some aspects, an apparatus for wireless communication includes means for transmitting an indication to apply, for one or more uplink communications of an SDM configuration, a group indication associated with downlink beams; and means for receiving the one or more uplink communications based at least in part on the group indication associated with the downlink beams.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
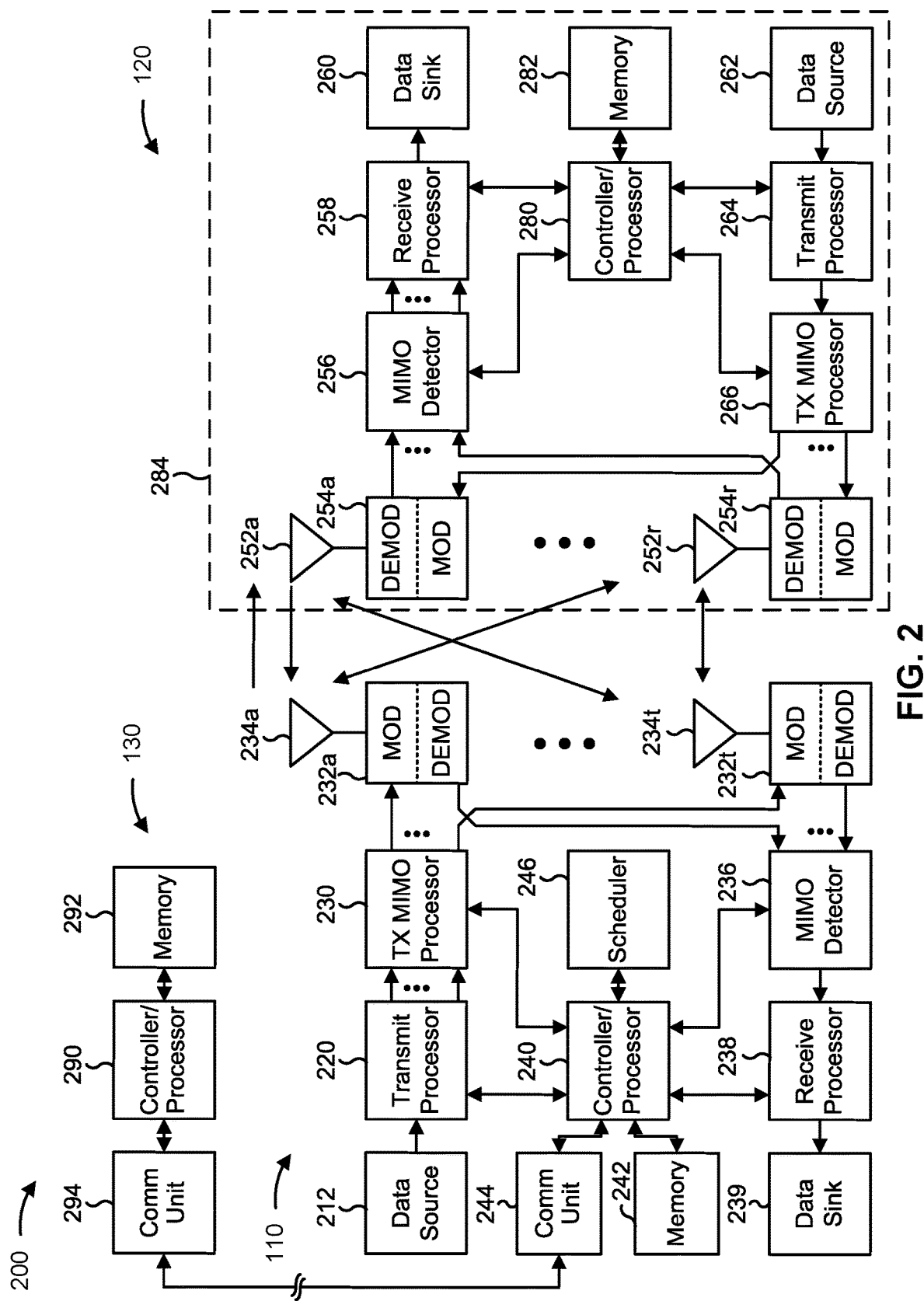
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with applying a transmission configuration indicator group indication, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving an indication to apply, for one or more uplink communications of an SDM configuration, a group indication associated with downlink beams; and/or means for transmitting the one or more uplink communications based at least in part on the group indication associated with the downlink beams. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting the one or more uplink communications using UE transmit beams that are associated with the downlink beams.

In some aspects, the UE includes means for transmitting the one or more uplink communications using UE transmit beams that are associated with a subset of the downlink beams.

In some aspects, the UE includes means for receiving one or more downlink communications transmitted using the downlink beams.

In some aspects, the UE includes means for transmitting uplink communications based at least in part on the group indication associated with the downlink beams for a duration of time.

In some aspects, the UE includes means for transmitting a request to stop transmitting uplink communications based at least in part on the group indication associated with the downlink beams.

In some aspects, the UE includes means for receiving an indication of one or more parameters for transmission of the request to stop transmitting uplink communications based at least in part on the group indication associated with the downlink beams.

In some aspects, the UE includes means for receiving an indication to stop transmitting uplink communications based at least in part on the group indication associated with the downlink beams.

In some aspects, the base station includes means for transmitting an indication to apply, for one or more uplink communications of an SDM configuration, a group indication associated with downlink beams; and/or means for receiving the one or more uplink communications based at least in part on the group indication associated with the downlink beams. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for receiving the one or more uplink communications using base station receive beams that are associated with the downlink beams.

In some aspects, the base station includes means for receiving the one or more uplink communications using base station receive beams that are associated with a subset of the downlink beams.

In some aspects, the base station includes means for transmitting one or more downlink communications using the downlink beams.

In some aspects, the base station includes means for receiving uplink communications based at least in part on the group indication associated with the downlink beams for a duration of time.

In some aspects, the base station includes means for receiving a request for a user equipment to stop transmitting uplink communications based at least in part on the group indication associated with the downlink beams.

In some aspects, the base station includes means for transmitting an indication of one or more parameters for transmission of the request to stop transmitting uplink communications based at least in part on the group indication associated with the downlink beams.

In some aspects, the base station includes means for transmitting an indication to stop transmitting uplink communications based at least in part on the group indication associated with the downlink beams.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
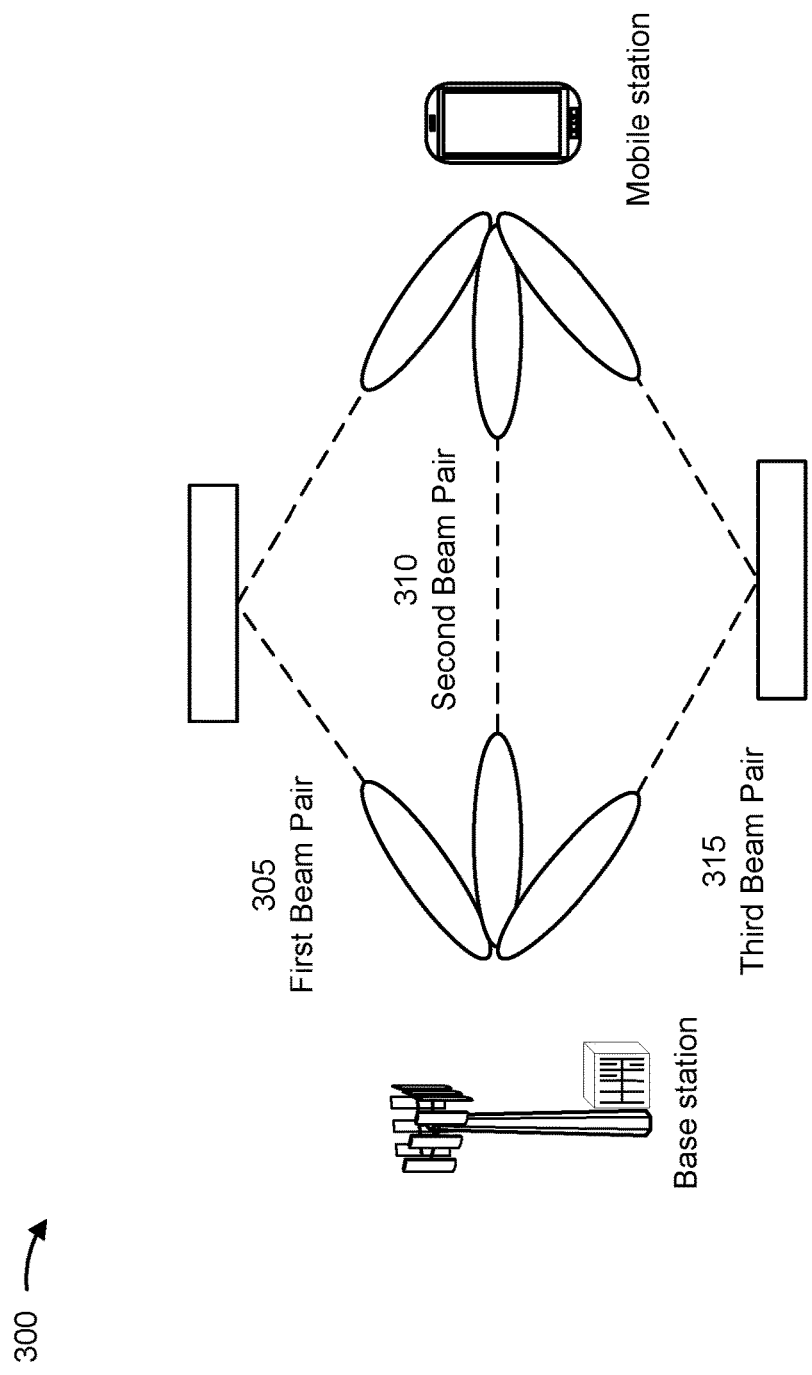
FIG. 3 is a diagram illustrating an example associated with spatial division multiplexing, in accordance with the present disclosure.

FIG. 3 is a diagram illustrating an example 300 associated with SDM, in accordance with the present disclosure. As shown in FIG. 3, a UE may communicate with a base station. For example, the UE may communicate with the base station via a first beam pair 305, a second beam pair 310, and/or a third beam pair 315. Each of the beam pairs includes a UE receive beam and a base station transmit beam that are configured to transmit and/or receive communications on an associated beam path. Each of the associated beam paths may have spatial diversity from other associated beam paths based at least in part on having different angles at which the associated beam paths intersect the UE or the base station.

As used herein, "beam" may refer to any beam of a beam pair in either uplink or downlink directions. For example, as used herein, "beam" may refer to one or more of a UE transmit beam, a base station receive beam, a base station transmit beam, and/or a UE receive beam that are all associated with communications on a same beam path.

The base station and the UE may communicate using the beam pairs simultaneously (e.g., overlapping in time) based at least in part on spatial division multiplexing. In other words, the UE may simultaneously transmit a first communication on a first beam path (e.g., using a first UE transmit beam), a second communication on a second beam path (e.g., using a second UE transmit beam), and/or a third communication on a third beam path (e.g., using a third UE transmit beam). The base station may receive the first communication, the second communication, and the third communication by processing signaling from the UE based at least in part on directions from which the base station receives portions of the signaling.

The UE and the base station may communicate using directional beams associated with frequency bands within, for example, FR2, and/or frequency bands within frequency ranges having higher frequencies than FR2 (e.g., FR4 and/or FR5, among other examples). In some wireless networks, beams may be configured with widths that are based at least in part on frequencies used for communications. For example, a beam may be configured with a relatively narrow width based at least in part on the UE or the base station using the beam for communications on a relatively high frequency band.

The UE and/or the base station may be configured to communicate via a single beam per antenna group or may be configured to communicate via multiple beams per antenna group. For example, the UE and/or the base station may form multiple beams from a single antenna group using multiple phased arrays in the single antenna group, lenses, and/or Butler matrices. The UE and/or the base station may form multiple beams from a single antenna group based at least in part on communicating using frequency bands in frequency ranges above FR2 (e.g., sub-terahertz signals and/or millimeter wave signals, among other examples).

As indicated above, FIG. 3 is provided as an example. Other examples may differ from what is described with regard to FIG. 3.

Communications between a base station and a UE using SDM (e.g., using multiple beams and multiple beam paths) may involve communications of control information between the base station and the UE. For example the base station may transmit separate indications of each beam pair to be used for SDM, including separate indications for uplink beam pairs and downlink beam pairs. When using several beam pairs in SDM, the base station may consume may consume power, computing, network, and/or communication resources to transmit multiple separate indications for each beam pair to be used for SDM.

In some aspects described herein, a base station may configure one or more transmission configuration indicator (TCI) groups that each include one or more TCI state identifications. Each of the TCI state indications refers to a base station beam that the base station will use to transmit, with the base station beam paired with a UE beam associated with a same beam path. The base station may determine one or more TCI state identifications to include in a TCI state group based at least in part on a measurement report that indicates measurements of reference signals (e.g., channel state information (CSI) reference signals (CSI-RSs), as indicated by a UE. The base station may transmit (e.g., using radio resource control (RRC) signaling or MAC signaling), to the UE, an indication of configurations of a set of TCI state groups. In some aspects, the base station may transmit an indication that the UE is to apply a TCI state group indication (associated with downlink beams) to one or more uplink communications. In other words, the base station may indicate that the UE is to use a same beam path for uplink communications as is indicated by the TCI state group indication for downlink beams.

After the base station has indicated configurations of the set of resource groups, the base station may transmit a downlink control information (DCI) message to indicate a TCI state group, of the set of TCI state groups, for the UE to use for receiving one or more downlink communications via multiple beams associated with the one or more TCI states included in the TCI state group. The UE may apply the TCI state group indication for one or more uplink communications. In some aspects, the UE may configure one or more UE transmit beams that use a same transmission path as downlink beams indicated by the TCI state group indication.

In this way, the base station and the UE may conserve power, computing, network, and/or communication resources that may have otherwise been consumed by receiving multiple DCI messages to configure uplink beams separately from downlink beams.

Figure 4:
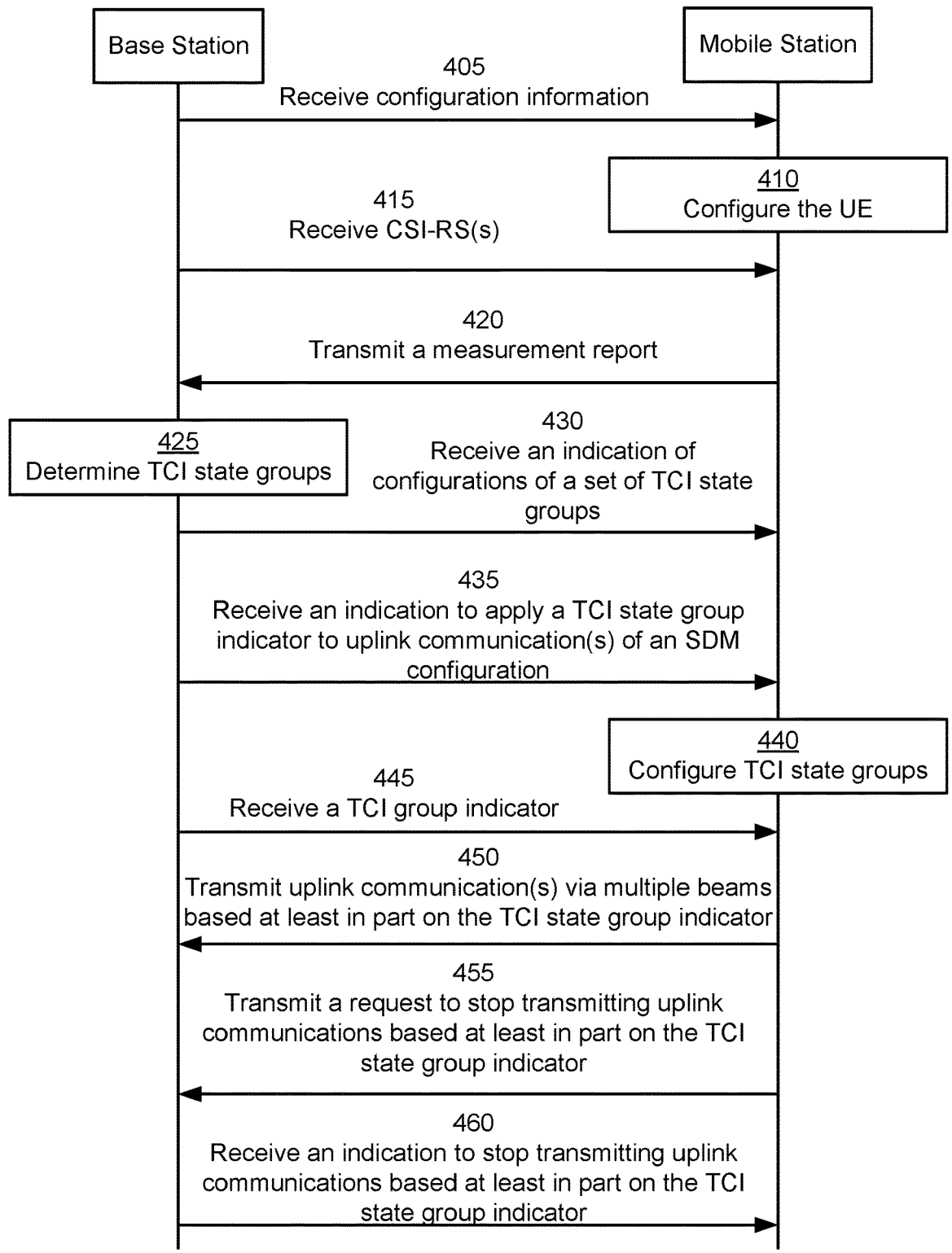
FIG. 4 is a diagram illustrating an example associated with applying a transmission configuration indicator state group indication, in accordance with the present disclosure.

FIG. 4 is a diagram illustrating an example 400 associated with applying a transmission configuration indicator state group indication, in accordance with the present disclosure. As shown in FIG. 4, a UE (e.g., UE 120) may communicate with a base station (e.g., base station 110). The UE and the base station may be part of a wireless network (e.g., wireless network 100). The UE and the base station may communicate using a frequency band that is within FR2 or a higher frequency range. In some aspects, the UE and the base station may communicate using beamforming. In some aspects, the UE and the base station may be configured to communicate using SDM. In some aspects, the UE may perform a cell search to find a cell provided by the base station. The UE may connect to the base station based at least in part on a random access channel process, among other examples.

As shown by reference number 405, the UE may receive configuration information (e.g., from the base station, another base station, and/or the like) and/or may determine the configuration information based at least in part on a communication protocol. In some aspects, the UE may receive the configuration information via one or more of RRC signaling, MAC control elements (MAC CEs), DCI, and/or the like. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to be configured to communicate using SDM. In some aspects, the configuration information may indicate that the UE is to receive an indication of configurations of sets of TCI state groups and that the UE is to store the configurations for selection by the base station. In some aspects, the configuration information may indicate that the UE is to configure components of the UE for communicating via multiple beams based at least in part on reception of a TCI state group indicator that indicates selection of a TCI state group of a set of TCI state groups. In some aspects, the configuration information may indicate that the UE is to configure components of the UE for transmitting uplink communications via multiple beams associated with TCI states indicated by the TCI state group.

As shown by reference number 410, the UE may configure the UE for communicating with the base station. In some aspects, the UE may configure the UE based at least in part on the configuration information. In some aspects, the UE may be configured to perform one or more operations described herein. In some aspects, the UE may transmit a capabilities report to the base station. For example, the capabilities report may indicate whether the UE may communicate using SDM, a maximum number of beams that the UE can use for SDM, and/or whether the UE can communicate via multiple beams of a single antenna group, among other examples.

As shown by reference number 415, the UE may receive, and the base station may transmit, one or more CSI-RS resources. In some aspects, the UE may measure the one or more CSI-RS resources to determine one or more metrics associated with different beams and/or beam paths for communicating with the base station. The one or more metrics may include RSRP, signal-to-interference-plus-noise ratio (SINR), RSRQ, RSSI, and/or CQI, among other examples.

In some aspects, the UE may receive the one or more CSI-RSs based at least in part on an indication, from the base station, of a configuration of configurations of resources to receive the one or more CSI-RSs. For example, the UE may receive a first CSI-RS resource for the UE to use to receive one or more CSI-RSs via a first beam, a configuration of a second CSI-RS resource for the UE to use to receive one or more CSI-RSs via a second beam, and/or a configuration of a third CSI-RS resource for the UE to use to receive one or more CSI-RSs via a third beam, among other examples. In some aspects, the base station may indicate a configuration of five or more CSI-RS resources, 10 or more CSI-RS resources, and/or the like.

As shown by reference number 420, the UE may transmit, and the base station may receive, a measurement report. The measurement report may indicate one or more measurements of metrics associated with the CSI-RSs, preferred beams for SDM communications, and/or a ranked order of preferred beams for SDM communications.

As shown by reference number 425, the base station may determine TCI state groups. For example, the base station may determine a set of TCI state groups based at least in part on the measurement report. In some aspects, the base station may determine which TCI states may be grouped for SDM downlink communications based at least in part on interference between the CSI-RSs. For example, the base station may determine the interference between the CSI-RSs based at least in part on reported SINRs for the CSI-RSs.

In some aspects, each TCI state group, of the set of TCI state groups, may have a same number of TCI state identifications. In some aspects, TCI state groups may have different numbers of TCI state identifications. In some aspects, the base station may attempt to maximize a number of TCI state identifications within a TCI state group that satisfy an interference parameter (e.g., an interference threshold). In some implementations, a TCI state may be included in multiple TCI state groups. For example, if a first CSI-RS has a relatively high RSRP and is measured to not cause substantial interference with other CSI-RSs, a first TCI state associated with the first CSI-RS may be included in multiple (e.g., all) TCI state groups. If a second CSI-RS has a relatively high RSRP and is measured to cause substantial interference with all but the first CSI-RS, a TCI state group may include only the first TCI state identification and a TCI state identification associated with the second CSI-RS. In some aspects, TCI state groups may have a threshold number of TCI state identifications (e.g., a minimum number of TCI state identifications). For example, if a threshold number of TCI state identifications is 3, the second TCI state identification may be excluded from the set of TCI state groups because it cannot be grouped with at least 2 other TCI state identifications.

As shown by reference number 430, the base station may transmit, and the UE may receive, an indication of configurations of the set of TCI state groups. In some aspects, the UE may receive the indication of configurations of the set of TCI state groups via RRC signaling and/or MAC signaling (e.g., one or more MAC CEs).

As shown by reference number 435, the base station may transmit, and the UE may receive, an indication to apply a TCI state group indicator to one or more uplink communications of an SDM configuration.

As shown by reference number 440, the UE may configure TCI state groups of the set of TCI state groups. In some aspects, the UE may store TCI state groups associated with TCI state group indicators for selection by the base station.

As shown by reference number 445, the UE may receive, and the base station may transmit, a TCI state group indicator. In some aspects, the TCI state group indicator may indicate multiple TCI state identifications for one or more downlink communications. In some aspects, the UE may receive the TCI state group indicator within a resource scheduling message (e.g., a DCI message or a configured grant, among other examples).

In some aspects, the TCI state group indicator may indicate the TCI state group based at least in part on satisfaction of an interference threshold among the multiple TCI state identifications of the TCI state group. For example, the base station may determine that interference among the multiple TCI state identifications satisfies a threshold (e.g., is at or below the threshold) based at least in part on the measurement report (e.g. as described in connection with reference number 420). In some aspects, the TCI state group indicator may indicate the TCI state group based at least in part on the TCI state group having a largest number of TCI state identifications that satisfy the interference threshold. In some aspects, the TCI state group indicator may indicate the TCI state group based at least in part on the TCI state group having a lowest interference among TCI state identifications of the TCI state groups (e.g., for TCI state groups with a same number of TCI state identifications). In some aspects, the TCI state group indicator may indicate the TCI state group based at least in part on the TCI state group having a lowest interference among TCI state identifications of the TCI state groups that satisfy a TCI state number threshold (e.g., that have a minimum number of TCI state identifications).

As shown by reference number 450, the UE may transmit, and the base station may receive, the one or more communications via multiple beams associated with the TCI state identifications of the TCI state group indicator. In some aspects, the multiple beams may be configured to communicate over a same beam path as beams indicated by the TCI state group indicator. For example, the UE may configure one or more components of the UE (e.g., antenna groups, transmission chains, and/or baseband components, among other examples) to transmit the one or more communications via the multiple beams using SDM. In some aspects, the UE may transmit multiple streams via the multiple beams. In some aspects, the UE may transmit a single stream via the multiple beams.

In some aspects, the UE may transmit the one or more communications (e.g., uplink communications) using UE transmit beams that are associated with all, or a subset, of the downlink beams. In some aspects, the subset of downlink beams may be indicated by the base station (e.g., in the indication to apply the TCI state group indicator to the one or more uplink communications described in connection with reference number 435). In some aspects, the subset of downlink beams may be determined based at least in part on configuration information (e.g., associated with configuring the SDM configuration), a protocol standard, and/or measurements of the CSI-RSs. For example, the UE may receive an indication of a number of the TCI state identifications to apply to transmitting the one or more uplink communications and/or may select the TCI state identifications to apply based at least in part on rankings of RSRP and/or SINR, among other examples, as measured from the CSI-RSs.

In some aspects, the UE may transmit the one or more uplink communications based at least in part on the TCI state group indication associated with the downlink beams for a duration of time, for a number of uplink communications, and/or until receiving an indication to stop transmitting uplink communications based at least in part on the TCI state group indication associated with the downlink beams, among other examples.

As shown by reference number 455, the UE may transmit, and the base station may receive, a request to stop transmitting uplink communications based at least in part on the TCI state group indicator. In some aspects, the UE may transmit the request via uplink control information and/or one or more MAC CEs, among other examples. In some aspects, the UE may request before transmitting any uplink communications based at least in part on the TCI state group indicator. In other words, the request may be a request to not transmit uplink communications based at least in part on the TCI state group indicator, and may be transmitted after transmitting one or more uplink communications or may be transmitted without transmitting any uplink communications based at least in part on the TCI state group indicator.

In some aspects, the UE may transmit the request based at least in part on one or more parameters, such as a detection of a maximum permissible exposure event for a UE transmit beam that is associated with a TCI state of the TCI state group indicator a detection of a maximum permissible exposure event for a UE transmit beam that is associated with a TCI state of the TCI state group indicator, a detection of channel quality conditions that satisfy a channel quality threshold, a detection of traffic conditions that satisfy a traffic threshold, a detection of a beam failure, and/or a detection of radio link failure, among other examples. In some aspects, the UE may receive an indication of the one or more parameters from the base station.

As shown by reference number 460, the base station may transmit, and the UE may receive, an indication to stop transmitting uplink communications based at least in part on the TCI state group indicator. In some aspects, the UE may receive the indication via uplink control information, one or more MAC CEs, and/or RRC signaling, among other examples.

Based at least in part on the base station configuring the UE with a set of TCI state groups and configuring the UE to apply a TCI state group indication to transmission of one or more uplink communications, the base station may indicate multiple TCI state identifications to use for uplink and downlink communication using a single DCI and/or using a number of bits that is less than individual indications of the multiple TCI state identifications. In this way, the base station and the UE may conserve power, computing, network, and/or communication resources that may have otherwise been consumed by receiving multiple DCI messages to configure the UE to communicate via a first set of beams for uplink communications and a second set of beams for downlink communications.

As indicated above, FIG. 4 is provided as an example. Other examples may differ from what is described with regard to FIG. 4. For example, any type of group indication associated with downlink beams may be used instead of, or in addition to, a TCI state group indication.

Figure 5:
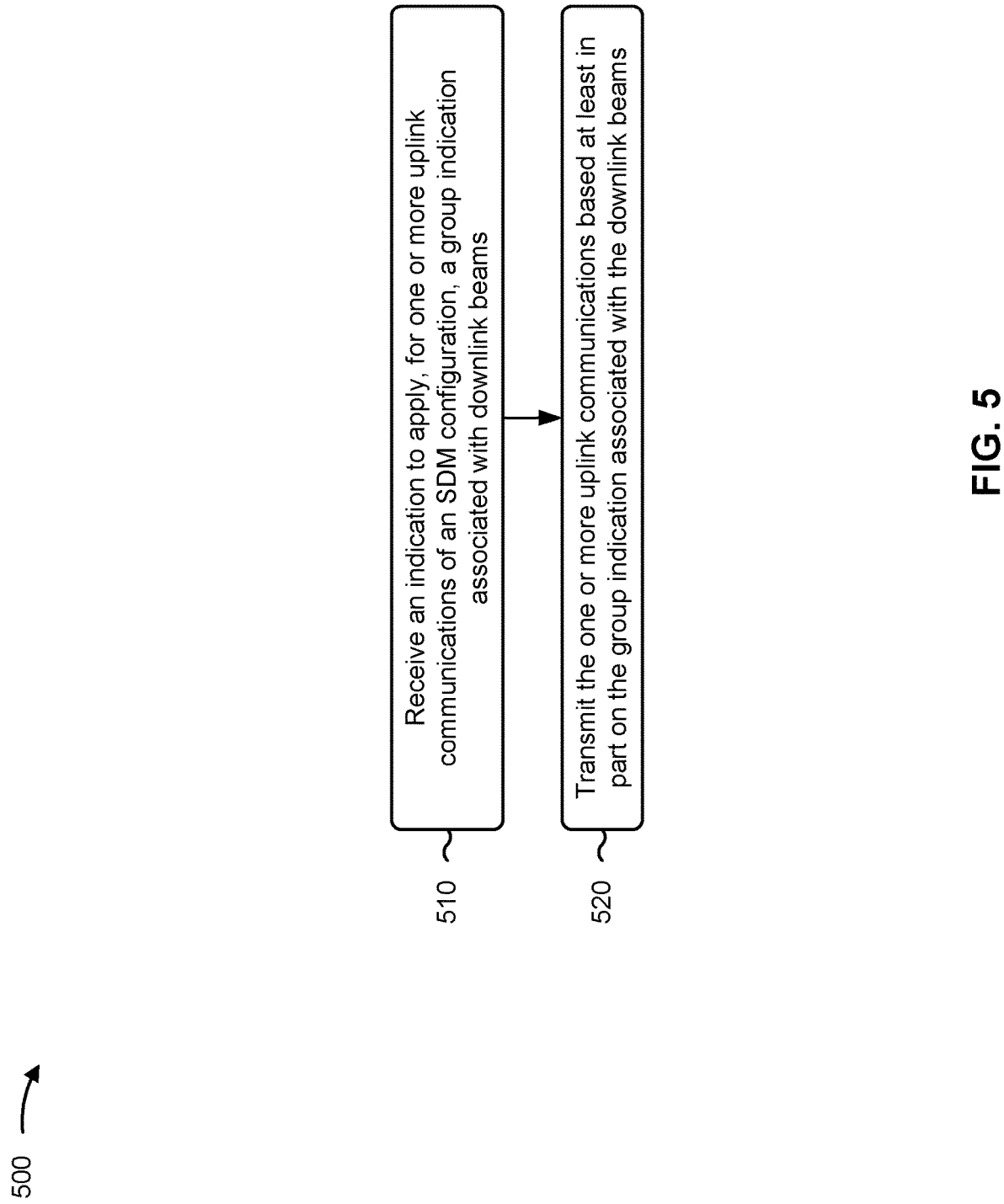
FIGS. 5 and 6 are diagrams illustrating example processes associated with applying a transmission configuration indicator state group indication, in accordance with the present disclosure.

FIG. 5 is a diagram illustrating an example process 500 performed, for example, by a UE, in accordance with the present disclosure. Example process 500 is an example where the UE (e.g., UE 120) performs operations associated with applying a TCI state group indication.

As shown in FIG. 5, in some aspects, process 500 may include receiving an indication to apply, for one or more uplink communications of an SDM configuration, a group indication associated with downlink beams (block 510). For example, the UE (e.g., using reception component 702, depicted in FIG. 7) may receive an indication to apply, for one or more uplink communications of an SDM configuration, a group indication associated with downlink beams, as described above.

As further shown in FIG. 5, in some aspects, process 500 may include transmitting the one or more uplink communications based at least in part on the group indication associated with the downlink beams (block 520). For example, the UE (e.g., using transmission component 704, depicted in FIG. 7) may transmit the one or more uplink communications based at least in part on the group indication associated with the downlink beams, as described above.

Process 500 may include additional aspects, such as any single aspect or any combination of aspects described below and/or in connection with one or more other processes described elsewhere herein.

In a first aspect, transmitting the one or more uplink communications based at least in part on the group indication associated with the downlink beams comprises transmitting the one or more uplink communications using UE transmit beams that are associated with the downlink beams.

In a second aspect, alone or in combination with the first aspect, transmitting the one or more uplink communications based at least in part on the group indication associated with the downlink beams comprises transmitting the one or more uplink communications using UE transmit beams that are associated with a subset of the downlink beams.

In a third aspect, alone or in combination with one or more of the first and second aspects, the subset of the downlink beams is indicated in a protocol standard, or the subset of the downlink beams is indicated in a communication from a base station associated with the SDM configuration.

In a fourth aspect, alone or in combination with one or more of the first through third aspects, process 500 includes receiving one or more downlink communications transmitted using the downlink beams.

In a fifth aspect, alone or in combination with one or more of the first through fourth aspects, transmitting the one or more uplink communications based at least in part on the group indication associated with the downlink beams comprises transmitting uplink communications based at least in part on the group indication associated with the downlink beams for a duration of time.

In a sixth aspect, alone or in combination with one or more of the first through fifth aspects, process 500 includes transmitting a request to stop transmitting uplink communications based at least in part on the group indication associated with the downlink beams.

In a seventh aspect, alone or in combination with one or more of the first through sixth aspects, process 500 includes receiving an indication of one or more parameters for transmission of the request to stop transmitting uplink communications based at least in part on the group indication associated with the downlink beams.

In an eighth aspect, alone or in combination with one or more of the first through seventh aspects, the one or more parameters comprise one or more of a detection of a maximum permissible exposure event for a UE transmit beam that is associated with a TCI state of the TCI state group indicator, a detection of channel quality conditions that satisfy a channel quality threshold, a detection of traffic conditions that satisfy a traffic threshold, a detection of a beam failure, or a detection of radio link failure.

In a ninth aspect, alone or in combination with one or more of the first through eighth aspects, process 500 includes receiving an indication to stop transmitting uplink communications based at least in part on the group indication associated with the downlink beams.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
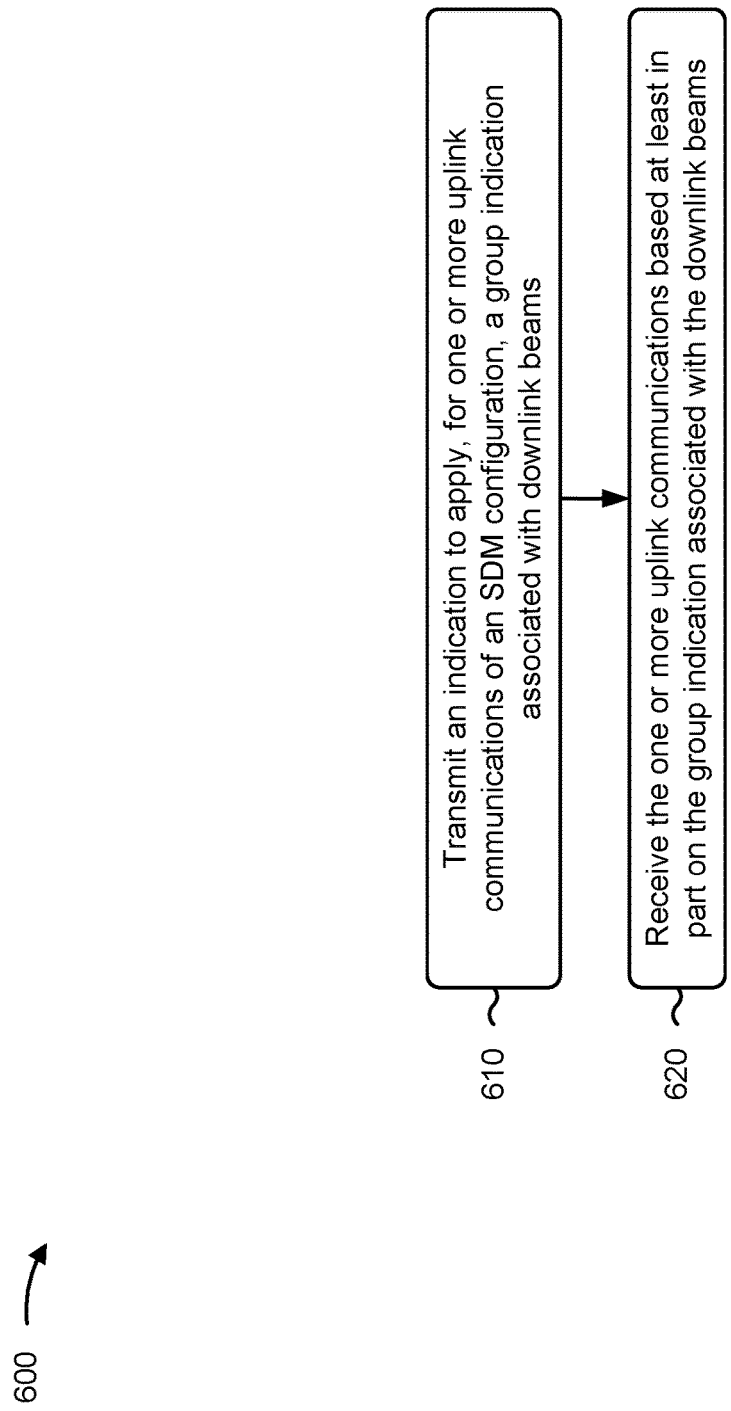

FIG. 6 is a diagram illustrating an example process 600 performed, for example, by a base station, in accordance with the present disclosure. Example process 600 is an example where the base station (e.g., base station 110) performs operations associated with applying a TCI state group indication.

As shown in FIG. 6, in some aspects, process 600 may include transmitting an indication to apply, for one or more uplink communications of an SDM configuration, a group indication associated with downlink beams (block 610). For example, the base station (e.g., using transmission component 804, depicted in FIG. 8) may transmit an indication to apply, for one or more uplink communications of an SDM configuration, a group indication associated with downlink beams, as described above.

As further shown in FIG. 6, in some aspects, process 600 may include receiving the one or more uplink communications based at least in part on the group indication associated with the downlink beams (block 620). For example, the base station (e.g., using reception component 802, depicted in FIG. 8) may receive the one or more uplink communications based at least in part on the group indication associated with the downlink beams, as described above.

Process 600 may include additional aspects, such as any single aspect or any combination of aspects described below and/or in connection with one or more other processes described elsewhere herein.

In a first aspect, receiving the one or more uplink communications based at least in part on the group indication associated with the downlink beams comprises receiving the one or more uplink communications using base station receive beams that are associated with the downlink beams.

In a second aspect, alone or in combination with the first aspect, receiving the one or more uplink communications based at least in part on the group indication associated with the downlink beams comprises receiving the one or more uplink communications using base station receive beams that are associated with a subset of the downlink beams.

In a third aspect, alone or in combination with one or more of the first and second aspects, the subset of the downlink beams is indicated in a protocol standard, or the subset of the downlink beams is indicated in a communication to a user equipment associated with the SDM configuration.

In a fourth aspect, alone or in combination with one or more of the first through third aspects, process 600 includes transmitting one or more downlink communications using the downlink beams.

In a fifth aspect, alone or in combination with one or more of the first through fourth aspects, receiving the one or more uplink communications based at least in part on the group indication associated with the downlink beams comprises receiving uplink communications based at least in part on the group indication associated with the downlink beams for a duration of time.

In a sixth aspect, alone or in combination with one or more of the first through fifth aspects, process 600 includes receiving a request for a UE to stop transmitting uplink communications based at least in part on the group indication associated with the downlink beams.

In a seventh aspect, alone or in combination with one or more of the first through sixth aspects, process 600 includes transmitting an indication of one or more parameters for transmission of the request to stop transmitting uplink communications based at least in part on the group indication associated with the downlink beams.

In an eighth aspect, alone or in combination with one or more of the first through seventh aspects, the one or more parameters comprise one or more of a detection of a maximum permissible exposure event for a UE transmit beam that is associated with a TCI state of the TCI state group indicator, a detection of channel quality conditions that satisfy a channel quality threshold, a detection of traffic conditions that satisfy a traffic threshold, a detection of a beam failure, or a detection of radio link failure.

In a ninth aspect, alone or in combination with one or more of the first through eighth aspects, process 600 includes transmitting an indication to stop transmitting uplink communications based at least in part on the group indication associated with the downlink beams.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
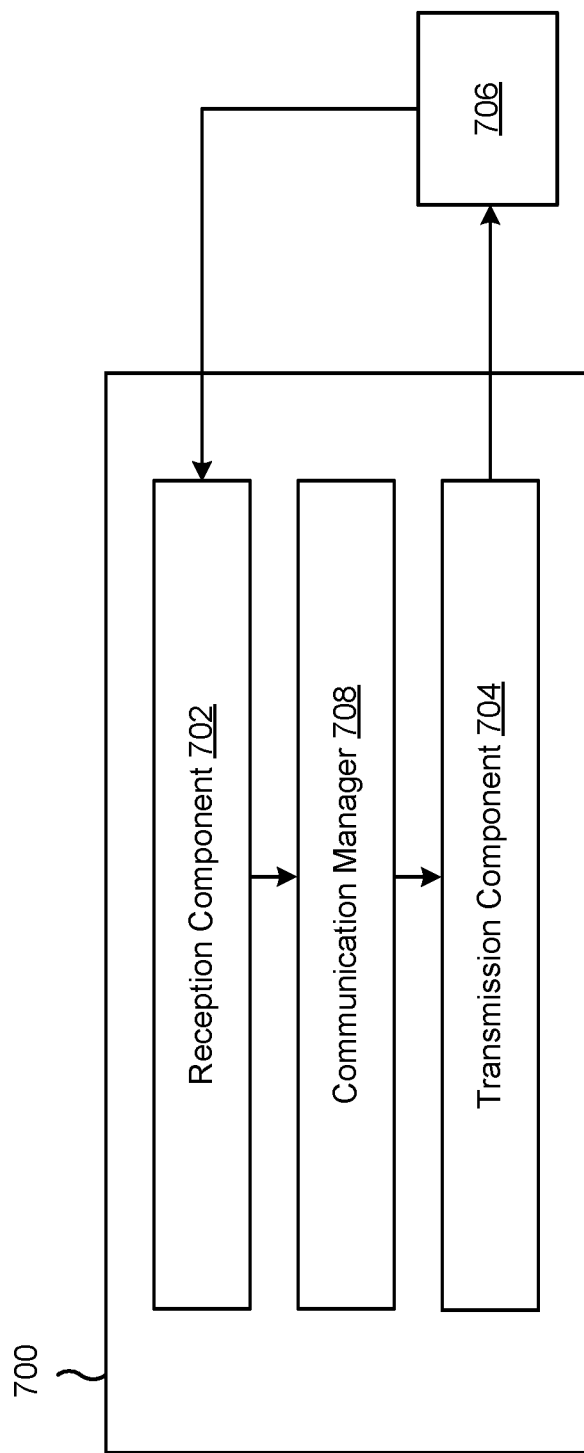
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive an indication to apply, for one or more uplink communications of an SDM configuration, a group indication associated with downlink beams. The transmission component 704 may transmit the one or more uplink communications based at least in part on the group indication associated with the downlink beams.

The reception component 702 may receive one or more downlink communications transmitted using the downlink beams.

The transmission component 704 may transmit a request to stop transmitting uplink communications based at least in part on the group indication associated with the downlink beams.

The reception component 702 may receive an indication of one or more parameters for transmission of the request to stop transmitting uplink communications based at least in part on the group indication associated with the downlink beams.

The reception component 702 may receive an indication to stop transmitting uplink communications based at least in part on the group indication associated with the downlink beams.

The communication manager 708 may manage communications between the apparatus 700 and the apparatus 706. For example, the communication manager 708 may configure one or more components of the apparatus 700 to form a beam for communication with the apparatus 706. In some aspects, the communication manager 708 may perform one or more determinations, based at least in part on received and/or measured information, for communicating with the apparatus 706.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
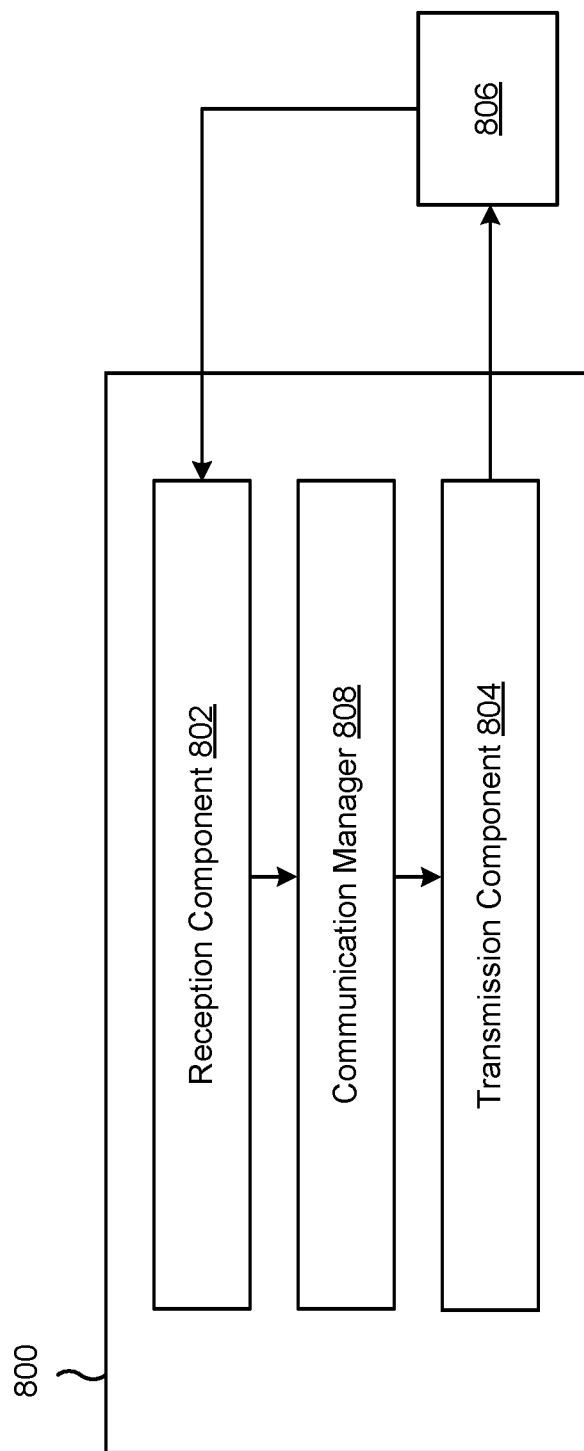

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit an indication to apply, for one or more uplink communications of an SDM configuration, a group indication associated with downlink beams. The reception component 802 may receive the one or more uplink communications based at least in part on the group indication associated with the downlink beams.

The transmission component 804 may transmit one or more downlink communications using the downlink beams.

The reception component 802 may receive a request for a user equipment to stop transmitting uplink communications based at least in part on the group indication associated with the downlink beams.

The transmission component 804 may transmit an indication of one or more parameters for transmission of the request to stop transmitting uplink communications based at least in part on the group indication associated with the downlink beams.

The transmission component 804 may transmit an indication to stop transmitting uplink communications based at least in part on the group indication associated with the downlink beams.

The communication manager 808 may manage communications between the apparatus 800 and the apparatus 806. For example, the communication manager 808 may configure one or more components of the apparatus 800 to form a beam for communication with the apparatus 806. In some aspects, the communication manager 808 may perform one or more determinations, based at least in part on received and/or measured information, for communicating with the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving an indication to apply, for one or more uplink communications of a spatial division multiplexing (SDM) configuration, a group indication associated with downlink beams; and transmitting the one or more uplink communications based at least in part on the group indication associated with the downlink beams.

Aspect 2: The method of Aspect 1, wherein transmitting the one or more uplink communications based at least in part on the group indication associated with the downlink beams comprises: transmitting the one or more uplink communications using UE transmit beams that are associated with the downlink beams.

Aspect 3: The method of any of Aspects 1-2, wherein transmitting the one or more uplink communications based at least in part on the group indication associated with the downlink beams comprises: transmitting the one or more uplink communications using UE transmit beams that are associated with a subset of the downlink beams.

Aspect 4: The method of Aspect 3, wherein the subset of the downlink beams is indicated in a protocol standard, or wherein the subset of the downlink beams is indicated in a communication from a base station associated with the SDM configuration.

Aspect 5: The method of any of Aspects 1-4, further comprising: receiving one or more downlink communications transmitted using the downlink beams.

Aspect 6: The method of any of Aspects 1-5, wherein transmitting the one or more uplink communications based at least in part on the group indication associated with the downlink beams comprises: transmitting uplink communications based at least in part on the group indication associated with the downlink beams for a duration of time.

Aspect 7: The method of any of Aspects 1-6, further comprising: transmitting a request to stop transmitting uplink communications based at least in part on the group indication associated with the downlink beams.

Aspect 8: The method of Aspect 7, further comprising: receiving an indication of one or more parameters for transmission of the request to stop transmitting uplink communications based at least in part on the group indication associated with the downlink beams.

Aspect 9: The method of Aspect 8, wherein the one or more parameters comprise one or more of: a detection of a maximum permissible exposure event for a UE transmit beam that is associated with a TCI state of the TCI state group indicator, a detection of channel quality conditions that satisfy a channel quality threshold, a detection of traffic conditions that satisfy a traffic threshold, a detection of a beam failure, or a detection of radio link failure.

Aspect 10: The method of any of Aspects 1-9, further comprising: receiving an indication to stop transmitting uplink communications based at least in part on the group indication associated with the downlink beams.

Aspect 11: A method of wireless communication performed by a base station, comprising: transmitting an indication to apply, for one or more uplink communications of a spatial division multiplexing (SDM) configuration, a group indication associated with downlink beams; and receiving the one or more uplink communications based at least in part on the group indication associated with the downlink beams.

Aspect 12: The method of Aspect 11, wherein receiving the one or more uplink communications based at least in part on the group indication associated with the downlink beams comprises: receiving the one or more uplink communications using base station receive beams that are associated with the downlink beams.

Aspect 13: The method of any of Aspects 10-12, wherein receiving the one or more uplink communications based at least in part on the group indication associated with the downlink beams comprises: receiving the one or more uplink communications using base station receive beams that are associated with a subset of the downlink beams.

Aspect 14: The method of Aspect 13, wherein the subset of the downlink beams is indicated in a protocol standard, or wherein the subset of the downlink beams is indicated in a communication to a user equipment associated with the SDM configuration.

Aspect 15: The method of any of Aspects 10-14, further comprising: transmitting one or more downlink communications using the downlink beams.

Aspect 16: The method of any of Aspects 10-15, wherein receiving the one or more uplink communications based at least in part on the group indication associated with the downlink beams comprises: receiving uplink communications based at least in part on the group indication associated with the downlink beams for a duration of time.

Aspect 17: The method of any of Aspects 10-16, further comprising: receiving a request for a user equipment to stop transmitting uplink communications based at least in part on the group indication associated with the downlink beams.

Aspect 18: The method of Aspect 17, further comprising: transmitting an indication of one or more parameters for transmission of the request to stop transmitting uplink communications based at least in part on the group indication associated with the downlink beams.

Aspect 19: The method of Aspect 18, wherein the one or more parameters comprise one or more of: a detection of a maximum permissible exposure event for a UE transmit beam that is associated with a TCI state of the TCI state group indicator, a detection of channel quality conditions that satisfy a channel quality threshold, a detection of traffic conditions that satisfy a traffic threshold, a detection of a beam failure, or a detection of radio link failure.

Aspect 20: The method of any of Aspects 10-19, further comprising: transmitting an indication to stop transmitting uplink communications based at least in part on the group indication associated with the downlink beams.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the memory and the one or more processors configured to perform the method of one or more Aspects of Aspects 1-20.

Aspect 23: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving an indication of configurations of a set of transmission control indication (TCI) state groups;
receiving an indication to apply, for one or more uplink communications of a spatial division multiplexing (SDM) configuration, a TCI state group of the set of TCI state groups, wherein the TCI state group is associated with downlink beams; and
transmitting the one or more uplink communications based at least in part on the TCI state group being associated with the downlink beams;
wherein the method further comprises at least one of:
transmitting a request to stop transmitting uplink communications based at least in part on the TCI state group associated with the downlink beams; or
receiving an indication to stop transmitting uplink communications based at least in part on the TCI state group being associated with the downlink beams.

2. The method of claim 1, wherein transmitting the one or more uplink communications comprises:
transmitting the one or more uplink communications using UE transmit beams that are associated with the downlink beams.

3. The method of claim 1, wherein transmitting the one or more uplink communications comprises:
transmitting the one or more uplink communications using UE transmit beams that are associated with a subset of the downlink beams.

4. The method of claim 3, wherein the subset of the downlink beams is indicated in a protocol standard, or
wherein the subset of the downlink beams is indicated in a communication from a base station associated with the SDM configuration.

5. The method of claim 1, further comprising:
receiving one or more downlink communications transmitted using the downlink beams.

6. The method of claim 1, wherein transmitting the one or more uplink communications comprises:
transmitting uplink communications based at least in part on the TCI state group associated with the downlink beams for a duration of time.

7. The method of claim 1, further comprising:
transmitting a request to stop transmitting uplink communications based at least in part on the TCI state group associated with the downlink beams.

8. The method of claim 7, wherein the request to stop transmitting uplink communications is transmitted based at least in part on an indication of one or more parameters.

9. The method of claim 8, wherein the one or more parameters comprise one or more of:
a detection of a maximum permissible exposure event for a UE transmit beam that is associated with a TCI state of the TCI state group,
a detection of channel quality conditions that satisfy a channel quality threshold,
a detection of traffic conditions that satisfy a traffic threshold,
a detection of a beam failure, or
a detection of radio link failure.

10. The method of claim 1, further comprising:
receiving an indication to stop transmitting uplink communications based at least in part on the TCI state group being associated with the downlink beams.

11. A user equipment (UE) for wireless communication, comprising:
a memory; and
one or more processors, coupled to the memory, configured to:
receive an indication of configurations of a set of transmission control indication (TCI) state groups;
receive an indication to apply, for one or more uplink communications of a spatial division multiplexing (SDM) configuration, a TCI state group of the set of TCI state groups, wherein the TCI state group is associated with downlink beams; and
transmit the one or more uplink communications based at least in part on the TCI state group being associated with the downlink beams;
wherein the one or more processors are further configured to perform at least one of the following:
transmit a request to stop transmitting uplink communications based at least in part on the TCI state group associated with the downlink beams; or
receive an indication to stop transmitting uplink communications based at least in part on the TCI state group being associated with the downlink beams.

12. The UE of claim 11, wherein the one or more processors, to transmit the one or more uplink communications, are configured to:
transmit the one or more uplink communications using UE transmit beams that are associated with the downlink beams.

13. The UE of claim 11, wherein the one or more processors, to transmit the one or more uplink communications, are configured to:
transmit the one or more uplink communications using UE transmit beams that are associated with a subset of the downlink beams.

14. The UE of claim 13, wherein the subset of the downlink beams is indicated in a protocol standard, or
wherein the subset of the downlink beams is indicated in a communication from a base station associated with the SDM configuration.

15. The UE of claim 11, wherein the one or more processors are further configured to:
receive one or more downlink communications transmitted using the downlink beams.

16. The UE of claim 11, wherein the one or more processors, to transmit the one or more uplink communications, are configured to:
transmit uplink communications based at least in part on the TCI state group associated with the downlink beams for a duration of time.

17. The UE of claim 11, wherein the one or more processors are further configured to:
transmit a request to stop transmitting uplink communications based at least in part on the TCI state group associated with the downlink beams.

18. The UE of claim 17, wherein the request to stop transmitting uplink communications is transmitted based at least in part on an indication of one or more parameters.

19. The UE of claim 18, wherein the one or more parameters comprise one or more of:
a detection of channel quality conditions that satisfy a channel quality threshold, a detection of traffic conditions that satisfy a traffic threshold,
a detection of a beam failure, or
a detection of radio link failure.

20. The UE of claim 11, wherein the one or more processors are further configured to:
receive an indication to stop transmitting uplink communications based at least in part on the TCI state group being associated with the downlink beams.

21. A non-transitory computer-readable medium storing a set of instructions for wireless communication, the set of instructions comprising:
one or more instructions that, when executed by one or more processors of a user equipment (UE), cause the UE to:
receive an indication of configurations of a set of transmission control indication (TCI) state groups;
receive an indication to apply, for one or more uplink communications of a spatial division multiplexing (SDM) configuration, a TCI state group of the set of TCI state groups, wherein the TCI state group is associated with downlink beams; and
transmit the one or more uplink communications based at least in part on the TCI state group being associated with the downlink beams;
wherein the one or more instructions that, when executed by the one or more processors, further cause the UE to perform at least one of:
transmit a request to stop transmitting uplink communications based at least in part on the TCI state group associated with the downlink beams; or
receive an indication to stop transmitting uplink communications based at least in part on the TCI state group being associated with the downlink beams.

22. The non-transitory computer-readable medium of claim 21, wherein the one or more instructions, that cause the UE to transmit the one or more uplink communications, cause the UE to:
transmit the one or more uplink communications using UE transmit beams that are associated with the downlink beams.

23. The non-transitory computer-readable medium of claim 21, wherein the one or more instructions, that cause the UE to transmit the one or more uplink communications, cause the UE to:
transmit the one or more uplink communications using UE transmit beams that are associated with a subset of the downlink beams.

24. The non-transitory computer-readable medium of claim 23, wherein the subset of the downlink beams is indicated in a protocol standard, or
wherein the subset of the downlink beams is indicated in a communication from a base station associated with the SDM configuration.

25. The non-transitory computer-readable medium of claim 21, wherein the one or more instructions further cause the UE to:
transmit a request to stop transmitting uplink communications based at least in part on the TCI state group associated with the downlink beams.

26. An apparatus for wireless communication, comprising:
means for receiving an indication of configurations of a set of transmission control indication (TCI) state groups;
means for receiving an indication to apply, for one or more uplink communications of a spatial division multiplexing (SDM) configuration, a TCI state group of the set of TCI state groups, wherein the TCI state group is associated with downlink beams; and
means for transmitting the one or more uplink communications based at least in part on the TCI state group associated with the downlink beams;
wherein the apparatus further comprises at least one of:
means for transmitting a request to stop transmitting uplink communications based at least in part on the TCI state group associated with the downlink beams; or
means for receiving an indication to stop transmitting uplink communications based at least in part on the TCI state group being associated with the downlink beams.

27. The apparatus of claim 26, wherein the means for transmitting the one or more uplink communications comprises:
means for transmitting the one or more uplink communications using apparatus transmit beams that are associated with the downlink beams.

28. The apparatus of claim 26, wherein the means for transmitting the one or more uplink communications comprises:
means for transmitting the one or more uplink communications using apparatus transmit beams that are associated with a subset of the downlink beams.

29. The apparatus of claim 28, wherein the subset of the downlink beams is indicated in a protocol standard, or
wherein the subset of the downlink beams is indicated in a communication from a base station associated with the SDM configuration.

30. The apparatus of claim 26, further comprising:
means for transmitting a request to stop transmitting uplink communications based at least in part on the TCI state group associated with the downlink beams.

* * * * *